(12) United States Patent
Whelan et al.

(10) Patent No.: US 9,096,124 B2
(45) Date of Patent: Aug. 4, 2015

(54) FUEL CAP APPARATUS FOR USE WITH FUEL VENTING SYSTEMS

(75) Inventors: Sean Whelan, Lansing, MI (US); Steven E. Hovinga, Middleville, MI (US)

(73) Assignee: BRUNSWICK CORPORATION, Lake Forrest, IL (US)

( * ) Notice: Subject to any disclaimer, the term of this patent is extended or adjusted under 35 U.S.C. 154(b) by 1293 days.

(21) Appl. No.: 12/061,183

(22) Filed: Apr. 2, 2008

(65) Prior Publication Data

US 2009/0250468 A1    Oct. 8, 2009

(51) Int. Cl.
*B65D 51/16*    (2006.01)
*B60K 15/04*    (2006.01)
*B60K 15/035*    (2006.01)

(52) U.S. Cl.
CPC ........... *B60K 15/0406* (2013.01); *B60K 15/035* (2013.01); *B60K 15/03504* (2013.01); *B60K 2015/03509* (2013.01); *B60K 2015/03547* (2013.01); *B60K 2015/0451* (2013.01)

(58) Field of Classification Search
CPC ............. B60K 15/035; B60K 15/0406; B60K 15/03504; B60K 2015/03509; B60K 2015/0451; B60K 2015/03547
USPC ........ 220/86.1, 86.2, 203.02, 203.03, 203.16, 220/203.18, 203.19, 203.29, 731, 719; 141/59
See application file for complete search history.

(56) References Cited

U.S. PATENT DOCUMENTS

| | | | |
|---|---|---|---|
| 3,149,758 A * | 9/1964 | Bush et al. | 222/189.09 |
| 4,113,138 A | 9/1978 | Fields et al. | |
| 4,136,796 A | 1/1979 | Dubois et al. | |
| 4,168,012 A | 9/1979 | Hawkinson | |
| 4,512,499 A * | 4/1985 | Uuskallio | 220/374 |
| 4,825,905 A | 5/1989 | Whitley, II | |
| 5,275,213 A | 1/1994 | Perkins | |
| 5,327,946 A | 7/1994 | Perkins | |
| 5,503,199 A | 4/1996 | Whitley, II et al. | |
| 5,507,324 A | 4/1996 | Whitley, II et al. | |
| 5,522,769 A | 6/1996 | DeGuiseppi | |
| 5,730,183 A | 3/1998 | Kremsler | |
| 5,762,093 A | 6/1998 | Whitley, II | |
| 6,095,363 A | 8/2000 | Harris et al. | |
| 6,557,719 B1 | 5/2003 | Arnal et al. | |

(Continued)

FOREIGN PATENT DOCUMENTS

DE    19632690    2/1998
EP    0 831 572    3/1998

(Continued)

OTHER PUBLICATIONS

United States Patent and Trademark Office, "Non-Final Office Action," issued in connection with U.S. Appl. No. 12/391,782, issued Apr. 13, 2012, 20 pages.

(Continued)

*Primary Examiner* — Anthony Stashick
*Assistant Examiner* — James Way
(74) *Attorney, Agent, or Firm* — Hanley, Flight & Zimmerman, LLC (57) ABSTRACT

Fuel cap apparatus for use with fuel venting systems are described. An example fuel cap apparatus includes a body having a central cavity and a flange. A membrane is coupled to the body to form a passageway therethrough and coated with a material to substantially prevent the flow of liquid and permit the flow of gas through the passageway.

40 Claims, 5 Drawing Sheets

(56) References Cited

U.S. PATENT DOCUMENTS

| | | | |
|---|---|---|---|
| 6,719,824 | B1 | 4/2004 | Bowser |
| 6,895,943 | B1 | 5/2005 | Taxon |
| 6,908,874 | B2 * | 6/2005 | Woodhead et al. ............. 502/65 |
| 7,066,504 | B2 | 6/2006 | Perkins |
| 7,080,657 | B1 * | 7/2006 | Scott ......................... 137/15.18 |
| 7,159,741 | B2 | 1/2007 | Dehn et al. |
| 7,166,024 | B2 * | 1/2007 | Mashiko et al. ............. 454/370 |
| 7,367,998 | B2 | 5/2008 | Moessinger |
| 7,491,258 | B2 | 2/2009 | Gouzou et al. |
| 2006/0096909 | A1 | 5/2006 | Patch |
| 2006/0157117 | A1 | 7/2006 | Scott |
| 2007/0170186 | A1 * | 7/2007 | Bertani ......................... 220/303 |
| 2007/0175514 | A1 * | 8/2007 | Tharp et al. ................... 137/202 |
| 2009/0250119 | A1 | 10/2009 | Whelan |

FOREIGN PATENT DOCUMENTS

| | | |
|---|---|---|
| EP | 1892029 | 2/2008 |
| EP | 2106949 | 10/2009 |
| EP | 2106950 | 10/2009 |
| FR | 2774951 | 8/1999 |
| GB | 2 376 460 | 12/2002 |
| WO | 96/16288 | 5/1996 |
| WO | 2008/105724 | 9/2008 |

OTHER PUBLICATIONS

European Patent Office, "Extended European Search Report," issued in connection with European Patent Application No. 09004896.8 on May 27, 2013, 7 pages.

The United States Patent and Trademark Office, "Notice of Allowance and Fees Due," issued in connection with U.S. Appl. No. 12/391,782, mailed on Jul. 31, 2013, 13 pages.

European Patent Office, "Extended European Search Report," issued in connection with European Patent Application No. 09004897.6, Sep. 30, 2013 (6 pages).

United States Patent and Trademark Office, "Non-Final Office Action," issued in connection with U.S. Appl. No. 12/391,782, Nov. 15, 2012 (17 pages).

United States Patent and Trademark Office, "Final Rejection," issued in connection with U.S. Appl. No. 12/391,782, May 31, 2013 (12 pages).

United States Patent and Trademark Office, "Notice of Allowance," issued in connection with U.S. Appl. No. 12/391,782, Dec. 6, 2013 (17 pages).

United States Patent and Trademark Office, "Notice of Allowance and Fee(s) Due," issued in connection with U.S. Appl. No. 12/391,782, Mar. 3, 2014, 25 pages.

European Patent Office, "Communication under Rule 71(3) EPC," issued in connection with European Patent Application No. 09004897.6, Jan. 20, 2015, 32 pages.

European Patent Office, "Communication under Rule 94(3) EPC," issued in connection with European Patent Application No. 09004896.8, on Mar. 26, 2015, 5 pages.

Canadian Intellectual Property Office, "Office Action," issued in connection with Canadian Patent Application No. 2,661,235, on Apr. 10, 2015, 4 pages.

Canadian Intellectual Property Office, "Office Action," issued in connection with Canadian Patent Application No. 2,661,236, on Apr. 7, 2015, 3 pages.

* cited by examiner

FUEL CAP APPARATUS FOR USE WITH FUEL VENTING SYSTEMS

FIELD OF THE DISCLOSURE

The present disclosure relates generally to fuel caps and, more particularly, to fuel cap apparatus for use with fuel venting systems.

BACKGROUND

Many vehicles such as boats and other marine crafts have fuel systems that require venting. For example, venting a fuel tank equalizes the pressure in the tank by releasing fuel vapors and allowing atmospheric air to flow into the fuel tank so that the liquid fuel can be drawn from the tank via suction. Some venting systems employ a separate venting tube or line to vent the fuel tank, while other venting systems employ a venting tube in combination with a filling device. Although a separate vent tube prevents the buildup of fuel pressure within the tank, it does not prevent contamination of the environment as a result of unintentional overboard venting of liquid fuel, which frequently occurs when a marine fuel tank is being refueled due to fuel tank overfilling and/or due to splashing, sloshing or other fuel surges during boat movement. Additionally, separate vent tubes are prone to allow the ingress of water and other contaminates into the fuel stored in the tank, which can lead to engine damage.

To prevent liquid fuel from escaping or passing through the venting tube due to tank overfilling and/or due to splashing, sloshing or other fuel surges, the vent tube and filling device are often combined and in fluid communication. Typically, boats are provided with a filling device integrally formed with a vent tube that can mount to a deck of the boat and connect to the fuel tank via fluid hoses and/or other conduits. In this manner, the combined filling device and vent tube prevents the unintentional overboard venting of liquid fuel during boat movements and returns fuel overflow to the tank in case of tank overfill. A combined vent tube and filling device typically requires a fuel cap that has a vent formed therein. Also, a vented fuel cap must typically allow adequate airflow through the fuel cap and prevent water and other contaminates from passing through the vent of the fuel cap and into the fuel tank.

Preventing the ingress of water through the fuel cap is important to prevent engine damage. However, allowing the venting of fuel vapors is also important to release the fuel vapors from the fuel tank and allow sufficient atmospheric airflow so that the liquid fuel in the tank can flow to the engine. Thus, a vented fuel cap typically requires a passageway in which the venting area is large enough to allow vapors and atmospheric air to pass therethrough, but small enough to prevent the ingress of water and other contaminates. However, a passageway that is small enough to prevent the ingress of water and other contaminates often provides an insufficient and ineffective venting area for venting atmospheric air and fuel vapors.

DETAILED DESCRIPTION

In general, the example fuel cap apparatus described herein provides a vented fuel cap for use with fuel fill apparatus such as, for example, a fuel fill apparatus of a marine craft (e.g., a boat). The example apparatus described herein provides a fuel cap having a vent passageway that inhibits water and other contaminates from entering through the fuel cap while having a venting area that allows sufficient and effective continuous fuel tank ventilation. Additionally, the example fuel cap prevents liquid fluid (e.g., fuel) from escaping through the vent passageway of the fuel cap.

In particular, the example fuel cap apparatus includes a membrane coated with a material (e.g., a hydrophobic material) that repels liquid to prevent ingress of water through the membrane. The material can be a fluoropolymer material (commonly known as Teflon®) such as, for example, polytetrafluoroethylene, etc. The membrane may be integrally formed with the fuel cap to form one or more venting passageways that substantially inhibit the ingress of water and other contaminants into a fuel tank and allow the ingress of atmospheric air and the egress of fuel vapors through the one or more passageways at relatively high flow rates. Additionally, the example fuel cap apparatus includes a deflection shield that creates a tortuous path to substantially prevent liquid fuel from flowing through the passageways (e.g., from the fuel tank) and into the environment.

Figure 1A:
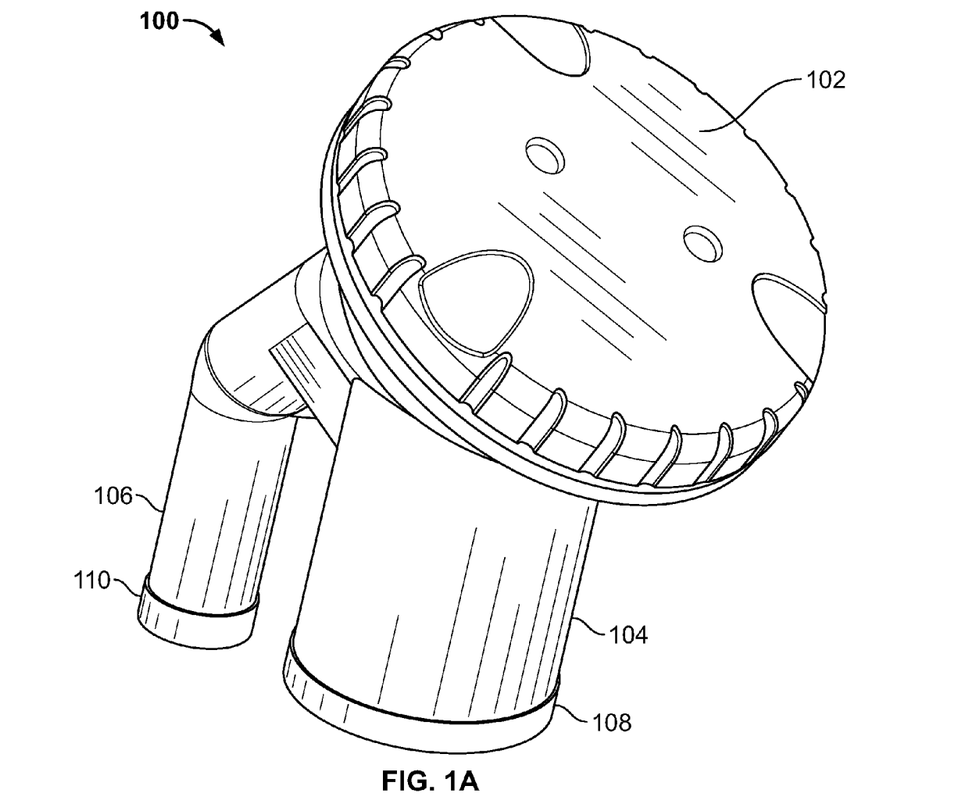
FIG. 1A is an assembly view of an example fuel fill apparatus implemented with the fuel cap apparatus described herein.

FIG. 1A illustrates an example fuel filling assembly or fuel fill apparatus 100 for use with marine crafts that is implemented with an example closure cap assembly 102 described herein. The example fuel fill apparatus 100 may be referred to as a deckfill and is adapted for mounting to a deck of a marine craft such as, for example, a deck 302 (FIG. 3) of a boat (not shown). The example fuel fill apparatus 100 includes a fill tube 104 and a vent tube 106 that extends through an opening 304 (FIG. 3) of the deck 302 when the fuel fill apparatus 100 is mounted to the deck 302 of a boat. Although not shown in the illustration, fluid hoses and/or other conduits are coupled to terminal ends 108 and 110 of the fill tube 104 and the vent tube 106, respectively, and extend to the fuel tank, which is typically positioned below the deck 302. In some example implementations, the fill tube 104 and/or the vent tube 106 can be angled or slanted to facilitate the positioning and installation of the fuel fill apparatus 100 to the boat and/or the fluid hoses or other conduits and reduce the possibility of fuel spillage when filling the fuel tank. In other example implementations, the fill tube 104 and the vent tube 106 may be substantially straight. The fuel fill apparatus 100 of FIGS. 1A and 1B can be made of resinous or metal alloy materials such as polypropylene, nylon, stainless steel, bronze, aluminum, and/or any other suitable materials that are resistant to impact, fuel, weather, etc.

Figure 1B:
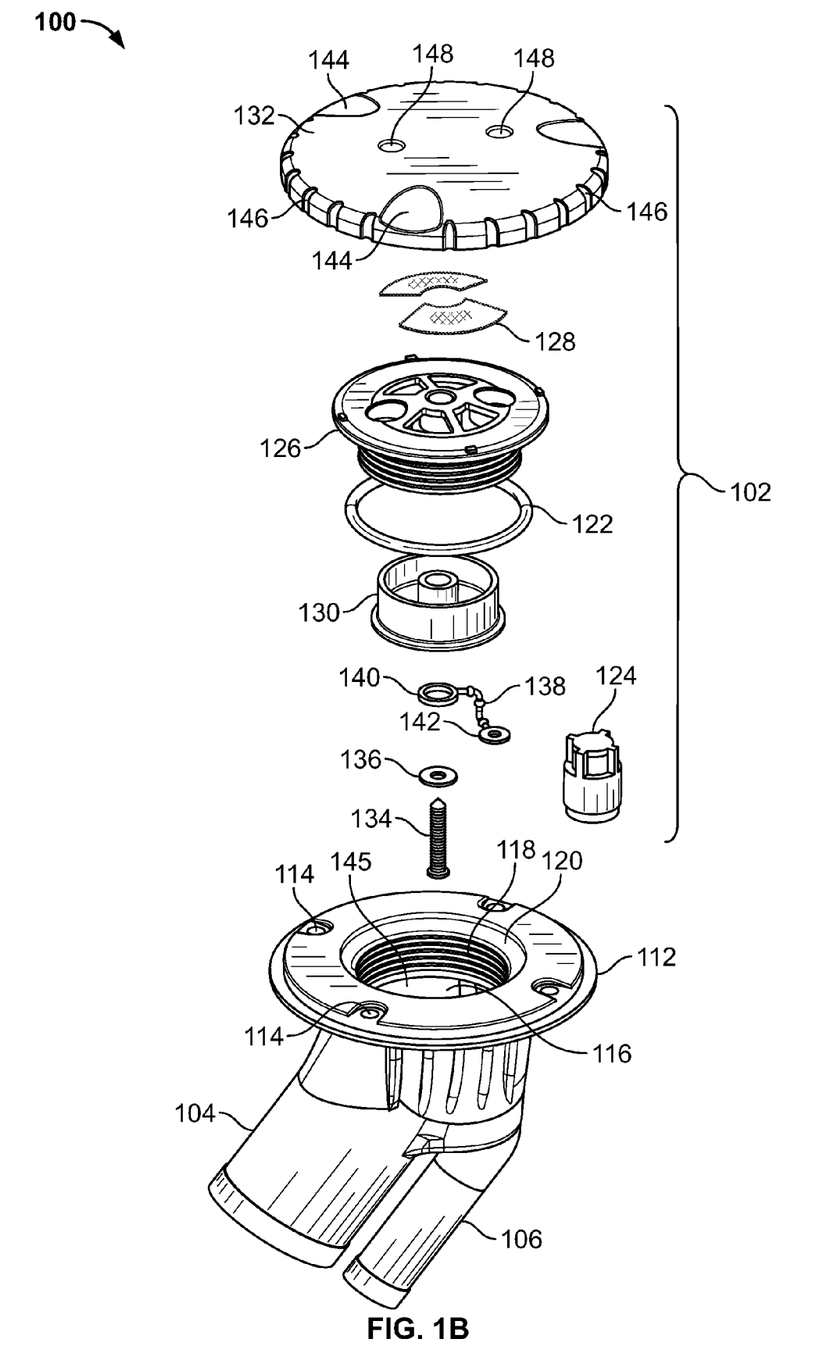
FIG. 1B is an exploded view of the example fuel fill apparatus illustrated in FIG. 1A.
Figure 3:
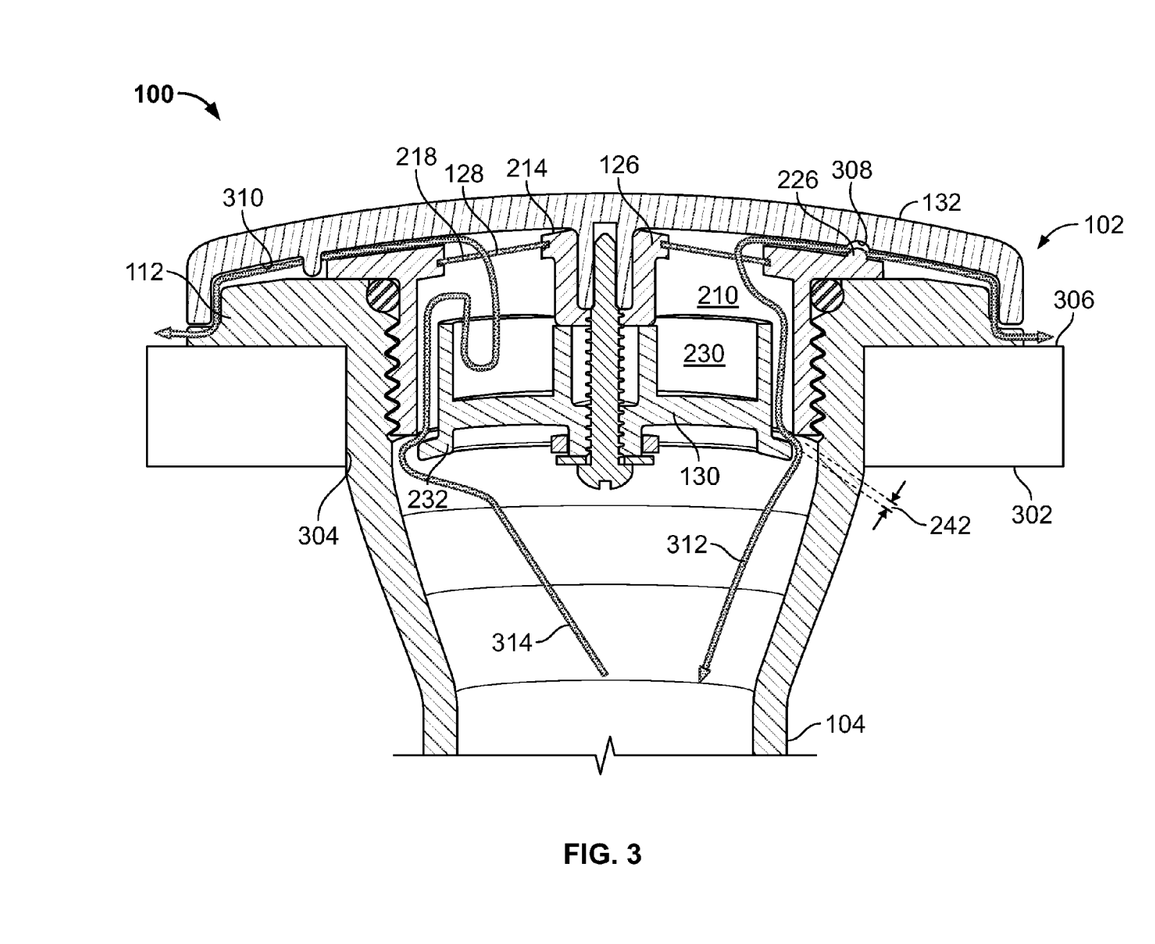
FIG. 3 is a cross-sectional view of the example fuel fill apparatus illustrated in FIGS. 1A and 1B.

FIG. 1B illustrates an exploded view of the example fuel fill devices or apparatus 100 of FIG. 1A. The fill tube 104 typically includes a generally planar, base plate or flange 112 that supports the fill tube 104 and the vent tube 106 when the fuel fill apparatus 100 is mounted to the deck 302 (FIG. 3). The flange 112 is illustrated as a circular flange that engages a surface 306 (FIG. 3) of the boat deck 302 and has a plurality of mounting holes 114 for mounting the fuel fill device 100 to the surface 306 of the deck 302. The fuel fill apparatus 100 can be mounted to the deck 302 of the boat via screws or any other suitable fastening mechanism(s) that pass into and/or through the mounting holes 114. In the example illustration, the fill tube 104, the vent tube 106, and the flange 112 are integrally formed (e.g., via injection molding) as a substantially unitary piece or structure. However, in other example implementations, the fill tube 104, the vent tube 106, and the flange 112 can be separate components coupled together via fasteners or any other suitable fastening mechanism(s). In yet other example implementations, such as the example illustrated in FIG. 4, the flange 112 can be square or any other polygonal-shaped member.

The fill tube 104 has an opening 116 for receiving a nozzle such as, for example, a nozzle of a fuel pump, etc. The closure cap assembly 102 removably couples to the opening 116. When coupled to the opening 116, the closure cap assembly 102 sealingly engages the opening 116 to close the opening 116 of the fill tube 104. The opening 116 can include internal threads 118 for receiving the closure cap assembly 102. However, in other example implementations, the fill tube 104 can include other suitable fastening mechanism(s) such as, for example, the fastening mechanism discussed below in connection with FIG. 4. The fill tube 104 may also include a recessed portion 120 near the opening 116 to receive a sealing member 122 such as, for example, an o-ring to provide a seal and prevent liquids and gases from entering and/or escaping between the closure cap assembly 102 and the opening 116 of the fill tube 104 when the closure cap assembly 102 is coupled to the fill tube 104.

The vent tube 106 is adjacent to and in fluid communication with the fill tube 104. The vent tube 106 returns liquid fuel overflow from the fill tube 104 back to a fuel tank (not shown) and provides venting of fuel vapors and passage of atmospheric air from and to the fuel tank. A diffuser 124 may be coupled (e.g., via a press fit) to the vent tube 106 to prevent liquid fuel from spraying out of the vent tube 106 and onto the deck 302 of the boat and/or a person operating a fuel pump during filling of the tank.

The closure cap assembly 102 includes a fuel cap 126, a screen or membrane 128, a deflection shield or deflection guard 130, and a cover 132 that are coupled together via a fastener 134. The closure cap assembly 102 may include a washer 136 and a tether strap 138. The tether strap 138 includes a first end 140 that couples to the deflection shield 130 via the fastener 134 and a second end 142 that couples to the fill tube 104 via, for example, an inside of surface 145, to secure the closure cap assembly 102 to the fuel fill apparatus 100 when the closure cap assembly 102 is removed from the opening 116 during filling of the tank. Although not shown, in some example implementations, the closure cap assembly 102 may include a ground (e.g., a grounding strap), which can discharge potential electrostatic charges that can exist in a metallic fuel pump nozzle and/or a person operating a fuel pump. A ground may be required depending on the type of material (e.g., metal) used to manufacture the example fuel fill apparatus 100.

In the illustrated example, the cover 132 includes a plurality of recessed grooves 144 and ribs 146 that provide a gripping surface when removing or coupling the closure cap assembly 102 to the fill tube 104. Additionally and/or alternatively, the cover 132 includes a plurality of recessed apertures 148 that receive a key (not shown) having pins to further tighten and/or loosen the closure cap assembly 102. However, in other examples, the recessed grooves 144, ribs 146 and/or the recessed apertures 148 may be excluded.

Figure 2A:
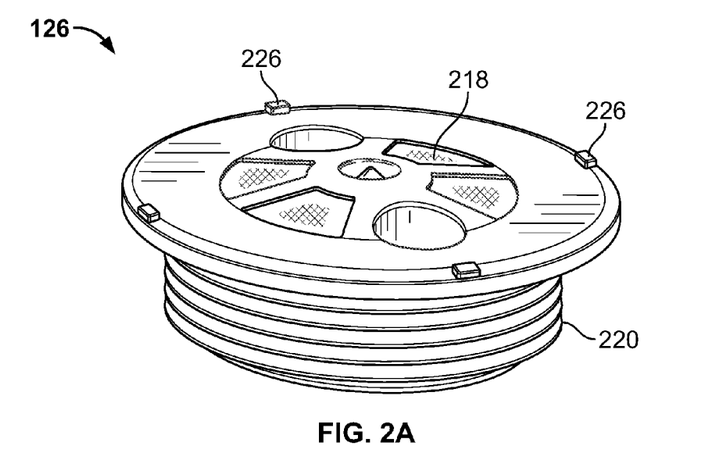
FIG. 2A is a perspective view of the example fuel cap apparatus of FIGS. 1A and 1B.
Figure 2B:
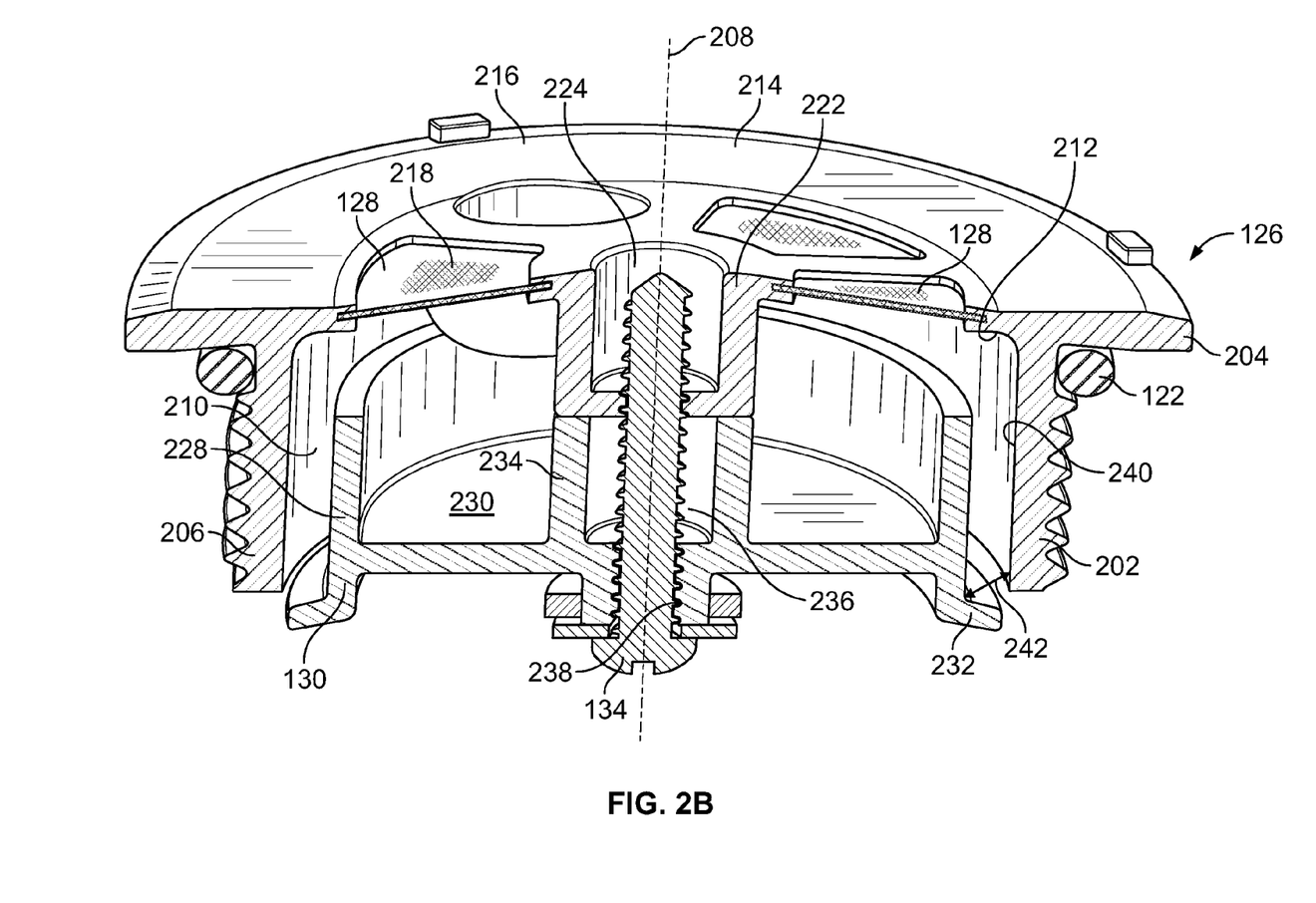
FIG. 2B is a cross-sectional view of the example fuel cap apparatus illustrated in FIGS. 1A, 1B and 2A.

FIG. 2A illustrates a perspective view and FIG. 2B illustrates a cross-sectional view of a portion of the example closure cap assembly 102 of FIG. 1B without the cover 132. The fuel cap 126 includes a body 202 having a flange 204. In the illustrated example, the body 202 has a generally cylindrical member 206 extending along a longitudinal axis 208 that includes a central cavity 210 defining a first side or interior side 212 (i.e., a non-exposed side) of the fuel cap 126 and a surface 214 defining a second side or exposed side 216 of the fuel cap 126. Additionally or alternatively, the outer surface 214 of the fuel cap 126 may have a convex contour or shape to repel and/or prevent liquid from entering through the passageways 218 (i.e., to allow water to run off the fuel cap 126).

The surface 214 of the body 202 includes one or more passageways 218 to allow the flow of gases between the first side 212 and the second side 216 of the fuel cap 126. As illustrated in FIGS. 2A and 2B, the passageways 218 are circumferentially spaced about the longitudinal axis 208 of the body 202. However, in other example implementations, one or more passageways 218 may be spaced in any desired manner (e.g., unequal spacing). For example, the surface 214 can include one or more passageways 218 axially aligned with the longitudinal axis 208 or a plurality of passageways 218 spaced about the longitudinal axis 208.

The body 202 can also include external threads 220 that threadably engage the internal threads 118 of the fill tube 104. A cylindrical portion 222 e.g., a hub or a boss) extends from the surface 214 of the body 202 and into the central cavity 210 and has an aperture 224 to receive the fastener 134. The flange portion 204 can also include a plurality of protrusions 226 that engage respective recessed grooves 308 (FIG. 3) of the cover 132 to provide a tight fit and prevent the cover 132 from moving (e.g., wobbling) relative to the fuel cap 126. The fuel cap 126 can be made of fuel, weather and/or impact resistant resinous materials such as polypropylene, nylon, (both of which can eliminate the need for electrical grounding), or any other suitable materials. In yet other example implementations, the example fuel cap 126 can be integrally formed as a substantially unitary or single piece via injection molding or any other suitable process(es).

The screen or membrane 128 is coated with a hydrophobic material such as, for example, a fluoropolymer material (e.g., Teflon®). The fluoropolymer material can comprise, for example, polytetrafluoroethylene, perfluoroalkoxy, fluorinated ethylene propylene, etc. The membrane 128 may be integrally formed (e.g., via insert molding) with the fuel cap 126 to form the one or more passageways 218. In the illustrated example, the membrane 128 is a stainless steel mesh or screen that is coated with Teflon® and insert molded with the fuel cap 126 to form the passageways 218. However, in other example implementations, the membrane 128 can be any suitable material that prevents the flow of liquid fluid therethrough. In yet other example implementations, the screen or membrane 128 can be coupled to the passageways 218 via adhesives, chemical fasteners, or any other suitable fastening mechanism(s).

As described above, the deflection shield 130 is coupled to the body 202 of the fuel cap 126 via for example, mechanical fasteners, chemical fasteners, insert molding, and/or any other suitable fastening mechanism(s). The deflection shield 130 includes a cylindrical body 228 having a cavity 230 and an annular deflection lip or flange 232 that extends laterally and outwardly from the body 228 of the deflection shield 130. The deflection shield 130 also includes a cylindrical member 234 having an aperture 236 to receive the fastener 134. The aperture 236 may included at least a threaded portion 238 to receive the fastener 134.

When coupled to the fuel cap 126, the lip 232 is spaced a distance from an inner surface 240 of the body 202 to create a gap 242 between the body 202 and the lip 232. The cylindrical member 234 of the deflection shield 130 engages the cylindrical portion 222 of the fuel cap 126 when coupled together. Thus, in some example implementations, a spacer (not shown) may be used between the cylindrical portion 222 of the fuel cap 126 and the cylindrical member 234 of the deflection shield 130 to form and/or increase the distance of the gap 242.

FIG. 3 is a cross-sectional view of the example fuel fill apparatus 100 of FIGS. 1A, 1B, 2A, and 2B coupled to the deck 302 of the boat. During filling and when the fuel cap 126 is removed, fuel vapors pass through the vent tube 106 and to the atmosphere through the opening 116 of the fill tube 104. If liquid fuel in the fill tube 104 rises above the vent tube 106 (e.g., due to overfilling or filling the tank too quickly), the fuel in the fill tube 104 is returned back to the fuel tank via the vent tube 106 without contaminating the deck 302 of the boat or the environment. Similarly, if the vent tube 106 overfills, the fluid (e.g., fuel) returns to the tank via the fill tube 104. Also, as noted above, the diffuser 124 prevents liquid fuel from spraying out of the vent tube 106 and onto the deck 302 and/or a person operating a fuel pump if the vent tube 106 overfills too quickly during filling of the tank. Once filling of the tank is complete, the closure cap assembly 102 is coupled to the fill tube 104.

When the fuel cap 126 is coupled to the fuel fill apparatus 100, pressure (e.g., due to fuel vapors) within the fuel tank will be relieved and atmospheric air admitted to the tank. As illustrated by pathway 312, air at atmospheric pressure is admitted to the fuel tank by passing between the rim 310 of the cover 132 and the flange 112 upwardly along the rim 310 and the surface 214 and through the passageways 218 of the fuel cap 126. The atmospheric air proceeds through the gap 242 pathway and to the fuel tank. The gap 242 provides a pathway for fluid vapor or gas to travel between the fuel tank (not shown) and the passageways 218. Likewise, fuel vapors escape or egress from the fuel tank to equalize the pressure within the fuel tank by following the reverse of the path 312 followed by the atmospheric air.

As illustrated in FIG. 3, a tortuous pathway 314 is formed by the fuel cap 126 and the deflection shield 130. The tortuous pathway 314 created by the fuel cap 126 and the deflection shield 130 prevents liquids from escaping or passing through the passageways 218. As illustrated, in the event of a fuel surge caused by splashing or sloshing during boat movement or the like, any liquid fuel traveling upwardly through fill tube 104 strikes the deflection shield 130 and deflects toward the fuel tank. The deflection shield 130 blocks the central cavity 210 of the fuel cap 126 to substantially prevent liquid fuel from escaping through the passageways 218 into the environment.

In the event that liquid (e.g., fuel) bypasses the deflection shield 130, the liquid must pass upwardly in a succession of steps via the tortuous pathway 314. In particular, the liquid passes through and travels upward along the gap 242 pathway formed between the fuel cap 126 and the deflection shield 130. After the liquid travels through the gap 242 pathway and the liquid approaches the passageways 218 of the fuel cap 126, the liquid travels toward the cavity 230 and is captured by the cavity 230 of the defection shield 130, thereby substantially preventing the liquid from escaping and/or passing through the passageways 218. Additionally, the membrane 128 substantially prevents the egress of liquid (e.g., fuel) through the passageways 218. Likewise, water and other contaminants flowing in opposite direction along the path 314 are prevented from entering the fuel tank due to the tortuous pathway 314. In particular, the liquid fluid (e.g., water) must travel between the rim 310 of the cover 132 and the flange 112 to the passageways 218, in which the membrane 128 prevents the ingress of the fluid and other contaminants from entering through the passageways 218. Additionally, the convex contour or shape of the surface 212 of the fuel cap 126 substantially inhibits the flow of fluid toward the passageway 218 and allows the fluid to run off of the fuel cap 126 away from the passageway 218 and through path 314 between the rim 310 and the cover 132.

Due to the non-stick properties of the fluoropolymer material used to form the membrane 128 and its hydrophobic properties (e.g., its ability to repel water), and the convex contour or shape of the surface 214 of the fuel cap 126, the passageways 218 can be sized to provide effective and sufficient cross-sectional venting area so that venting of fluid gases through the passageways 218 occurs at relatively high flow rates while preventing water and other contaminants from entering through the fuel cap 126. For example, the passageways 218 can be sized to provide at least 90 $mm^2$ venting area. Also, because the venting area is greatly increased in comparison to many known fuel fill apparatus, the example fuel fill apparatus 100 described herein can be manufactured with greater tolerances and variations, which results in lower manufacturing costs. Thus, the vented fuel cap 126 described herein provides a cross-sectional venting area (i.e., the passageways 218) large enough to allow effective and significant flow of fuel vapors and air therethrough, while substantially preventing the ingress of water and other contaminates into the fuel tank.

Figure 4:
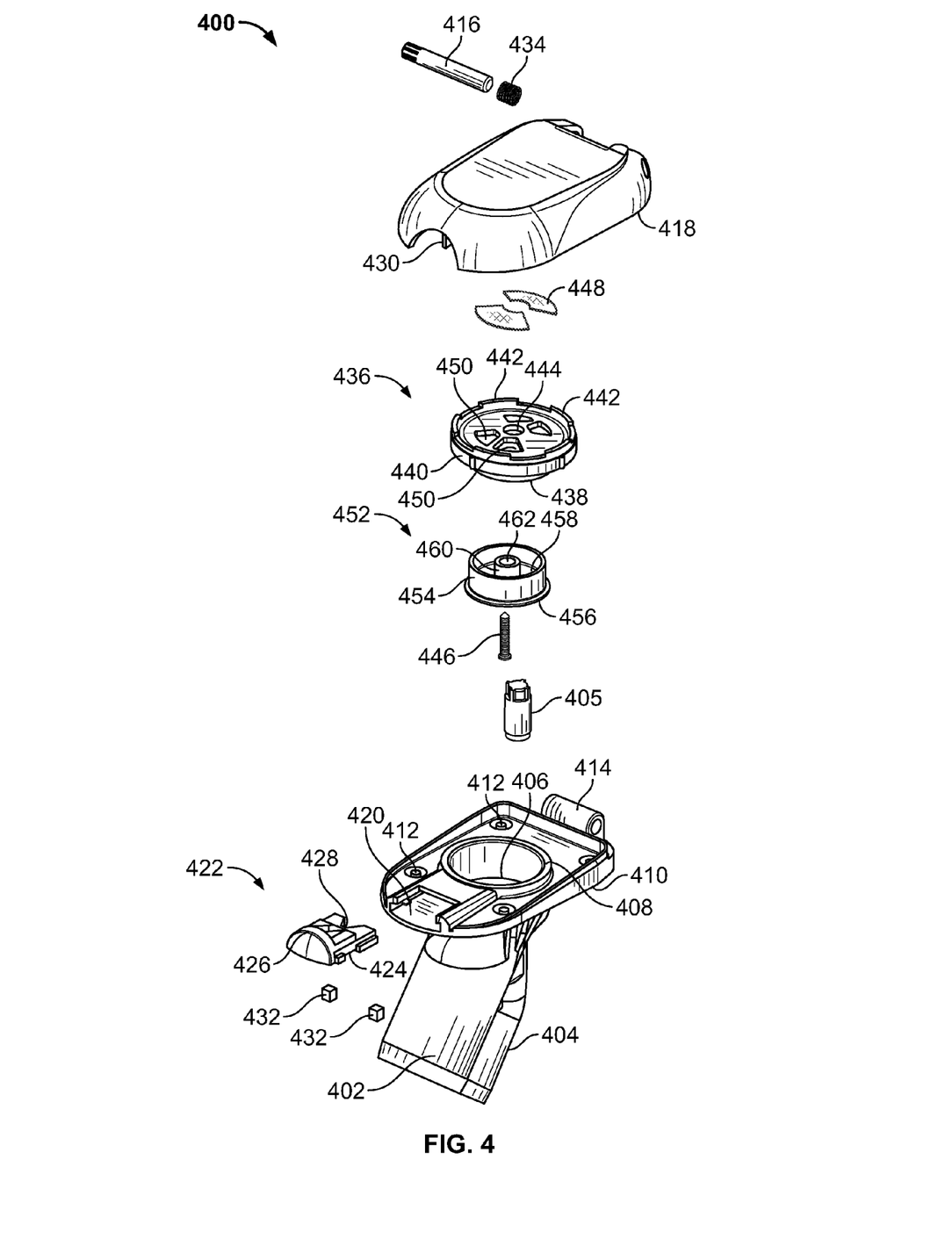
FIG. 4 is an alternative example embodiment of an example fuel fill apparatus.

FIG. 4 is an exploded view of an alternative example of a fuel fill device or apparatus 400. The example fuel fill apparatus 400 includes a fill tube 402 and a vent tube 404 adjacent to and in fluid communication with the fill tube 402. The fill tube 402 and the vent tube 404 extend through an opening of a deck (e.g., the deck 302 of FIG. 3) and connect to a fuel tank via fluid hoses and/or conduits. In some example implementations, the fill tube 402 and the vent tube 404 can be angled or slanted to facilitate installation or positioning of the fuel fill apparatus 400 with a boat deck and/or the fluid hoses or conduits and reduce fuel spillage when filling the fuel tank. In other example implementations, the fill tube 402 and the vent tube 404 may be substantially straight. The vent tube 404 may include a diffuser 405 to prevent liquid fuel from spraying out of the vent tube 404 and onto the deck of the boat and/or a person operating a fuel pump during filling of the tank.

The fill tube 402 includes an opening 406 for receiving a nozzle such as, for example, a nozzle of a fuel pump and a raised annular lip 408 adjacent to the opening 406. The fill tube 402 also includes a generally planar flange or base plate 410 that supports the fill tube 402 and the vent tube 404 when the fuel fill apparatus 400 is mounted to the deck. The base plate 410 is illustrated as a square flange that engages a surface (e.g., the surface 306 of FIG. 3) of the boat deck and has a plurality of mounting holes 412 for mounting the fuel fill apparatus 400 to the deck of the boat. The fuel fill apparatus 400 can be mounted to the deck of the boat via screws or any other suitable fastening mechanism(s) that pass into and/or through the mounting holes 412. In the example illustration, the fill tube 402, the vent tube 404, and the base plate 410 are integrally formed (e.g., via injection molding) as a substantially single piece or structure and can be made from fuel resistant materials, weather resistant materials, stainless steel, bronze, aluminum, or any other suitable material(s).

The base plate 410 includes a hinge 414 for receiving a hinge pin 416 that pivotally couples a cover 418 to the base plate 410 so that the cover 418 can pivot between an open and closed position. Additionally or alternatively, the base plate 410 includes a groove or track 420 that receives a latch 422 to lock the cover 418 in the closed position. The latch 422 includes a lever 424 having a grip or ridge 426 and a recessed portion 428 that engages a contact member 430 of the cover 418 to lock the cover 418 in the closed position. A biasing element (not shown) biases the lever 422 toward the contact member 430 so that the cover 418 remains in the closed position. To open the cover 418, the lever 424 is moved in an inwardly direction toward the cover 418, thereby releasing the contact member 430 of the cover 418 and pivoting the cover 418 to the open position. Stops 432 prevent the lever 424 from being pulled and/or removed from the groove or track 420. A spring 434 can be coupled to the hinge pin 416 to bias the cover 418 toward the opened position when the latch 422 releases the cover 418. The hinge pin 416 fastens (e.g., via press fit) to cover 418 to allow the cover 418 to pivot about hinge 414.

A fuel cap 436 removably and sealingly engages the opening 406 of the fill tube 402. The fuel cap 436 includes a body 438 having a flange portion 440. The flange portion 440 includes a recessed groove (not shown) that sealingly engages (e.g., via a press fit) the raised annular lip 408 of the fill tube 402 when the fuel cap 436 is coupled to the fill tube 402. The flange portion 440 also includes a plurality of protrusions 442 to provide a gripping surface and/or to engage a tool when coupling or removing the fuel cap 436 from the fill tube 402. The fuel cap 436 includes an aperture 444 for receiving a fastener 446.

A screen or membrane 448 coated with a fluoropolymer material (e.g., Teflon®) is integrally formed (e.g., via insert molding) with the fuel cap 436 to form one or more venting passageways 450. The membrane 448 can be made of a stainless steel and substantially prevents the ingress of water and other contaminants into the passageways 450 while allowing the flow of fuel vapors and atmospheric air between the fuel tank and a surrounding ambient for venting the fuel tank. The passageways 450 can be circumferentially spaced or spaced in any desired manner (e.g., unequal spacing, etc.)

A deflection shield 452 includes a body 454 and an annular deflection lip 456. The body 454 includes a cavity 458 and a cylindrical member 460 having an aperture 462 for receiving the fastener 446. When coupled together, the fuel cap 436 and the deflection shield 452 form a tortuous path (e.g., substantially similar to the tortuous path 314 of FIG. 3) to prevent liquid (e.g., fuel) from escaping through the venting passageways 450 of the fuel cap 436 if, for example, the fuel splashes from the fuel tank during boat movements. Also, the membrane 448 substantially prevents or restricts the egress of fuel via the passageways 450. Additionally, the fuel cap 436 and the deflection shield 452 form a fluid pathway (e.g., substantially similar to the pathway 312 of FIG. 3) to allow fuel vapor to vent from and atmospheric air to enter the fuel tank. Also, as discussed above, the membrane 448 allows atmospheric air and fuel vapors to pass through the passageways 450, while inhibiting water and other contaminants from entering via the passageways 450.

Similar to the fuel cap 126 described above, due to the characteristics and properties of the fluoropolymer material (e.g., Teflon®) and the surface tension of water, the membrane 448 described herein substantially prevents ingress of water and other contaminates via the passageways 450. In this manner, the passageways 450 can be sized to provide a sufficient and an effective cross-sectional venting area, such as, for example, a 90 mm$^2$ venting area, etc. Also, because the venting area is greatly increased as compared to many known fuel fill apparatus, the example fuel fill apparatus 400 described herein can be manufactured with greater tolerances and variations, which results in lower manufacturing costs.

Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A fuel cap apparatus, comprising:
a fuel cap having a body defining a first side of the fuel cap and a second side of the fuel cap, the body having an opening defining a perimeter, the perimeter and the opening being radially spaced relative to a central longitudinal axis of the body such that the central longitudinal axis does not intersect the perimeter and the opening; and
a membrane layer at least disposed within the opening of the body between an outlet and an inlet of the opening, the membrane layer to form a passageway therethrough and coated with a material to substantially prevent flow of liquid through the passageway and permit flow of gas through the passageway.

2. An apparatus as defined in claim 1, wherein the membrane layer is coated with a hydrophobic material.

3. An apparatus as defined in claim 2, wherein the hydrophobic material comprises a fluoropolymer material.

4. An apparatus as defined in claim 3, wherein the fluoropolymer material comprises at least one of polytetrafluoroethylene, perfluoroalkoxy, or fluorinated ethylene propylene.

5. An apparatus as defined in claim 1, wherein the membrane layer comprises a mesh.

6. An apparatus as defined in claim 5, wherein the mesh comprises a stainless steel mesh.

7. An apparatus as defined in claim 1, wherein the membrane layer is integrally formed with the body.

8. An apparatus as defined in claim 1, wherein the gas comprises at least one of a fuel vapor or atmospheric air.

9. An apparatus as defined in claim 1, wherein the body comprises a cylindrical outer body portion that defines a central cavity of the body and a flange portion.

10. An apparatus as defined in claim 9, wherein the body further comprises a central hub portion that extends into the central cavity.

11. An apparatus as defined in claim 10, wherein the passageway is in fluid communication with the cavity.

12. An apparatus as defined in claim 10, wherein the central hub portion includes a threaded aperture coaxially aligned with the central longitudinal axis of the body to receive a fastener.

13. An apparatus as defined in claim 10, further comprising a deflection shield coupled to the central hub portion to restrict the flow of liquid moving from a fuel tank toward the passageway.

14. An apparatus as defined in claim 13, wherein the deflection shield is coupled to the central hub via a fastener.

15. An apparatus as defined in claim 1, wherein a surface of the body has a convex contour shape to prevent liquid from entering through the passageway.

16. An apparatus as defined in claim 1, wherein the membrane layer is integrally formed with the opening of the body.

17. An apparatus as defined in claim 1, wherein the membrane layer allows continuous flow of gas or air therethrough.

18. An apparatus as defined in claim 1, wherein the passageway provides at least a 90 mm$^2$ venting area.

19. An apparatus as defined in claim 1, wherein the perimeter of the opening defines a generally trapezoidal shape.

20. An apparatus as defined in claim 1, wherein the entire membrane layer is disposed within the opening.

21. A fuel cap apparatus, comprising:
- a body having a surface that defines a first side of the fuel cap and a second side of the fuel cap, the first side being opposite the second side, the first side at least partially defining a cavity, the body having a cylindrical portion extending from the body toward the cavity;
- a passageway formed by an opening in the surface of the body, the passageway defining a perimeter, the passageway and the perimeter being radially spaced relative to a longitudinal axis of the cavity, the passageway to fluidly couple the first side of the fuel cap and the second side of the fuel cap; and
- a membrane layer disposed inside the opening between an outlet of the opening and an inlet of the opening defining the passageway, the membrane layer to permit flow of gas through the passageway between the first side and the second side and substantially restrict flow of liquid through the passageway between the first side and the second side.

22. A vented fuel cap as defined in claim 21, wherein the membrane layer is integrally formed with the passageway.

23. A vented fuel cap as defined in claim 21, wherein the membrane layer is coated with a fluoropolymer material.

24. A vented fuel cap as defined in claim 21, wherein the membrane layer comprises a stainless steel mesh.

25. A vented fuel cap as defined in claim 21, wherein the first side comprises an interior side of the fuel cap and the second side comprises an exterior side of the fuel cap.

26. An apparatus as defined in claim 21, further comprising a deflection guard coupled to the cylindrical portion and having an annular flange, the deflection guard, the annular flange, and the body to form a tortuous path to substantially restrict the flow of liquid from the first side to the second side via the passageway.

27. An apparatus as defined in claim 21, wherein the membrane layer comprises a perimeter that is greater than a perimeter of the opening such that at least a portion of the perimeter of the membrane layer is positioned within a slot formed in the body of the fuel cap when the membrane layer is disposed inside the opening, the slot being positioned between the inlet and the outlet of the opening.

28. A fuel fill apparatus to be mounted to a deck of a boat, comprising:
- a fill tube having a first end to receive a nozzle and a second end to be coupled to a fuel tank;
- a vent tube adjacent the fill tube and having a first end in fluid communication with the fill tube and a second end to be in fluid communication with the fuel tank;
- a fuel cap having a body, the body defining a cavity and a first opening and a second opening different from the first opening, wherein the cavity is in fluid communication with the first and second openings, the fuel cap to be removably coupled to the fill tube; and
- a first membrane and a second membrane, the first and second membranes being coated with a hydrophobic material, the first membrane being disposed in the first opening and the second membrane being disposed in the second opening, the first and second membranes and the first and second openings to define a passageway, the first and second membranes to inhibit the flow of liquid through the first and second openings and allow the flow of gas through the first and second openings.

29. An apparatus as defined in claim 28, further comprising a deflection shield coupled to the fuel cap to inhibit the flow of liquid through the cavity.

30. An apparatus as defined in claim 29, wherein the deflection shield and the body of the fuel cap form a tortuous path when the deflection shield is coupled to the fuel cap, the tortuous path to prevent liquid fuel from exiting the fuel fill apparatus via the cavity of the fuel cap.

31. An apparatus as defined in claim 29, wherein the deflection shield further comprises an annular deflection lip to form a gap for air and fuel vapor to pass to and from the fuel tank via the first and second openings of the fuel cap.

32. An apparatus as defined in claim 28, wherein the fuel cap is in fluid communication with the vent tube.

33. An apparatus as defined in claim 28, wherein the gas comprises at least one of atmospheric air or fuel vapors.

34. An apparatus as defined in claim 28, wherein the vent tube is to vent fuel vapor from the fuel tank, allow atmospheric air to enter the fuel tank through the first and second openings of the fuel cap, and provide a liquid fuel overflow return from the fill tube to the fuel tank.

35. An apparatus as defined in claim 28, wherein the first and second membranes each comprise a stainless steel screen.

36. An apparatus as defined in claim 28, wherein the hydrophobic material comprises a fluoropolymer material.

37. An apparatus as defined in claim 28, wherein the first and second membranes are integrally formed with the respective ones of the openings.

38. An apparatus as defined in claim 28, further comprising a cover, wherein the cover forms a tortuous path when coupled to the fuel cap to further restrict the flow of liquid from flowing through the first and second openings and allow flow of atmospheric air and fuel vapor through the first and second openings.

39. An apparatus as defined in claim 28, wherein the fuel cap further comprises a plurality of protrusions to engage a plurality of recesses of an inner surface of the cover.

40. An apparatus as defined in claim 28, wherein the first and second membranes are positioned inside the respective first and second openings such that the first and second membranes are positioned between respective inlets of the first and second opening and respective outlets of the first and second openings.

* * * * *